(12) United States Patent
Kempter (10) Patent No.: US 11,318,571 B2
(45) Date of Patent: May 3, 2022

(54) COUPLING MEMBER, MACHINE TOOL ADD-ON DEVICE, MACHINE TOOL, AND MEDIUM FEEDING METHOD

(71) Applicant: Roehm GmbH, Sontheim/Brenz (DE)

(72) Inventor: Stefan Kempter, Landensberg (DE)

(73) Assignee: Roehm GmbH, Sontheim/Brenz (DE)

( * ) Notice: Subject to any disclaimer, the term of this patent is extended or adjusted under 35 U.S.C. 154(b) by 483 days.

(21) Appl. No.: 16/345,063

(22) PCT Filed: Sep. 13, 2017

(86) PCT No.: PCT/EP2017/073031
§ 371 (c)(1),
(2) Date: May 16, 2019

(87) PCT Pub. No.: WO2018/077532
PCT Pub. Date: May 3, 2018

(65) Prior Publication Data
US 2019/0275623 A1    Sep. 12, 2019

(30) Foreign Application Priority Data
Oct. 25, 2016  (DE) .................... 10 2016 120 298.3

(51) Int. Cl.
*B23Q 11/10*  (2006.01)
*B23Q 3/12*   (2006.01)

(52) U.S. Cl.
CPC ................ *B23Q 3/12* (2013.01); *B23Q 11/10* (2013.01); *B23Q 2230/002* (2013.01); *F16N 2270/20* (2013.01)

(58) Field of Classification Search
CPC ........ B23Q 3/12; B23Q 11/121; B23Q 11/10; B23Q 11/122; B23Q 2230/002;
(Continued)

(56) References Cited

U.S. PATENT DOCUMENTS 4,598,617 A * 7/1986 Kubo .................. B23Q 1/0036
279/20
5,890,849 A * 4/1999 Cselle ................ B23Q 11/1084
408/1 R
(Continued)

FOREIGN PATENT DOCUMENTS

DE    102008014358 A1 * 10/2009 ............. B23P 23/04
DE    202013100177 U1    4/2014
(Continued)

OTHER PUBLICATIONS

Machine Translation, JP 2004-142069 A. (Year: 2004).*
International Search Report dated Dec. 15, 2017 in corresponding application PCT/EP2017/073031.

*Primary Examiner* — Chwen-Wei Su
(74) *Attorney, Agent, or Firm* — Muncy, Geissler, Olds & Lowe, P.C.

(57) ABSTRACT

A coupling element for a machine tool attachment, having a coupling section for detachable mounting on a tool interface of a machine tool and having a connection for attaching a container for media that has an outlet and holds a medium. In addition, a machine tool attachment, a machine tool, and a method for delivering a medium to a part of a machine tool is provided.

22 Claims, 8 Drawing Sheets

(58) Field of Classification Search
CPC ........ F16N 7/00; F16N 2270/20; F16N 19/00; F16N 2210/26; F16N 1/00; B23B 31/4036; B23B 31/4033; B23B 31/4026; B23B 31/406; Y10T 279/17111; Y10T 408/44

See application file for complete search history.

(56) References Cited

U.S. PATENT DOCUMENTS

| | | | |
|---|---|---|---|
| 5,895,182 | A | 4/1999 | Hayashi et al. |
| 6,116,825 | A * | 9/2000 | Kammermeier ........ B23B 51/06 279/20 |
| 7,849,969 | B2 | 12/2010 | Divisi |
| 8,678,724 | B2 * | 3/2014 | Lee ......................... B23B 51/06 409/136 |
| 9,981,356 | B2 * | 5/2018 | Sailing ..................... B23G 1/44 |
| 2014/0197608 | A1 | 7/2014 | Schneider |
| 2016/0158847 | A1 * | 6/2016 | Popp ..................... B23B 31/117 279/20 |

FOREIGN PATENT DOCUMENTS

| | | |
|---|---|---|
| EP | 1803529 A1 | 7/2007 |
| JP | 2004142069 A * | 5/2004 |

* cited by examiner

Fig. 9 ies.# COUPLING MEMBER, MACHINE TOOL ADD-ON DEVICE, MACHINE TOOL, AND MEDIUM FEEDING METHOD This nonprovisional application is a National Stage of International Application No. PCT/EP2017/073031, which was filed on Sep. 13, 2017, and which claims priority to German Patent Application No. 10 2016 120 298.3, which was filed in Germany on Oct. 25, 2016, and which are both herein incorporated by reference.

BACKGROUND OF THE INVENTION

Field of the Invention

The invention relates to a coupling element for a machine tool attachment. In addition, the invention relates to a machine tool attachment for delivering a medium to a part of a machine tool. The invention also relates to a machine tool and to a method for delivering a medium to a part of a machine tool.

Description of the Background Art

In machine tools, for example in milling machines of machining centers, it is necessary to deliver lubricant or liquid or gaseous media to the machine tool regularly or as needed. Thus it is necessary, for example, to lubricate the tool interface and, in particular, its clamping device or clamping mechanism, which ensures secure and tight holding of the machining tool in the machining spindle, as well as the workholding device, with a lubricant at regular intervals. Until now, this is accomplished by the means that the responsible worker manually performs the lubrication on the machine with a spray can or by means of a suitable lubricant brush. However, this is associated with the problem that the result of the lubrication operation is not reproducible. In particular, the quantity of the medium used and the location where the medium is applied by the worker depend heavily on the worker in question, and can differ markedly from one lubrication operation to the next. Another problem is that manual lubrication is forgotten in some cases or even neglected intentionally or delayed.

However, the service life of the clamping device is diminished severely by the lack of lubrication or inaccurate lubrication of the clamping device or its clamping mechanism. Also associated herewith is a successive loss of force, which has an adverse effect on the work result, because the tool is not drawn strongly enough into the tool interface of the machining spindle due to the loss of force, and consequently the machining of the workpiece is subject to inaccuracies.

Moreover, this method of manual lubrication has proven to be very time-consuming. First the machining of the workpiece must be stopped and the tool located in the tool interface must be placed in the tool magazine of the machining center before the machining spindle can be moved to the vicinity of the machine door, and the door can then be opened. Before the lubricant can then be sprayed into the tool interface by the spray can, the cooling lubricant that is still present from the machining must first be removed manually by means of a compressed-air spray gun, since it otherwise drips on the worker. Once the lubricant is distributed in the clamping mechanism by means of several idle strokes, the machine door can be closed again and the tool can be swapped into the machine spindle again by the appropriate program. This manual lubrication by means of a spray can usually involves a period of several minutes when the machine is out of operation, which has an adverse effect on productivity.

In machine tools, the tools used for machining the workpiece are usually received in the tool interface and gripped there. However, it is also already known from the prior art to have available machine tool attachments in the form of draw-in force measuring devices or workpiece probes (DE 60 2004 006 015 T2), and to insert these, instead of the tools, into the tool interface. These each fulfill a very specific purpose, however, which is to say they are not designed to deliver media to a part of the machine tool.

SUMMARY OF THE INVENTION

The object of the coupling element is thus to reduce the above disadvantages. In addition, an object of the present invention is to provide an additional machine tool attachment with which an automatic delivery of media to a part of a machine tool is possible, in particular. Moreover, an object of the invention is to provide an improved machine tool and an improved method for delivering a medium.

The object relating to the coupling element is attained according to the invention by a coupling element for a machine tool attachment having a coupling section for detachable mounting on a tool interface of a machine tool, and having a connection for attaching a container for media that has an outlet and holds a medium.

As a result, it is possible to store the coupling element like a normal tool in the machine's internal changer magazine or in the tool tray and to take it from there by means of a tool changer and insert it into the tool interface as needed instead of a machining tool in order to accomplish automatic delivery of a medium to a part of the machine tool, for example to a workholding device or a tool interface, and in particular the clamping device thereof. For this purpose, a container for media that holds the medium can be arranged on the connection, ultimately forming the machine tool attachment.

It has proven especially beneficial when an actuating means is provided that is movable between a dispensing position, in which the medium is discharged from the container for media, and a closed position, in which a discharge of the medium from the container for media is prevented. As a result of the actuating means that is movable between the dispensing position and the closed position, it is ensured that the medium is only discharged from the container for media when the actuating means is in the dispensing position. In the dispensing position, the actuating means acts directly or indirectly on the outlet of the container for media and opens the same so that the medium can be discharged from the container for media.

It has also proven to be especially preferred in this context when the actuating means is movable between the closed position and the dispensing position by means of the coupling of the coupling section to the tool interface. Consequently, in order to deliver the medium to the tool interface, the coupling element of the machine tool attachment need only be inserted into the tool interface and/or be clamped therein, by which means the actuating means can be moved and the medium can be discharged from the container for media and delivered to the tool interface. In this context, it has also proven especially successful when the actuating means is movable between the closed position and the dispensing position by the action of a clamping device of the tool interface. In this way, the actuating means can be moved upon chucking of the coupling section in the tool interface, by which means the medium can be distributed in the immediate vicinity of the tool interface especially effectively. In particular, provision is also made here that the movement of the actuating means is accomplished by a pressure piece of the clamping device. However, provision is also made within the scope of the invention that the actuating means is moved into the dispensing position upon insertion in the tool interface and is moved back into the closed position upon chucking.

It has, moreover, also proven to be advantageous when the actuating means is supported in a seat formed in the coupling element so as to be axially movable between the closed position and the dispensing position. As a result, the movement of the actuating means is ensured in an especially simple way. A guidance of the actuating means is also associated herewith, so that its movability between the closed position and the dispensing position is reliably ensured.

Furthermore, it has also turned out to be beneficial when the actuating means has a first end face with a first actuating contour and a second end face with a second actuating contour. This takes into account, in particular, the circumstance that there are containers for media with different outlets, namely with female and male outlets, so that a male or a female actuating contour is needed, wherein the male actuating contour has an appropriate pin and the female actuating contour has an appropriate receptacle for the male outlet of the container for media. Depending on which actuating contour is required, the actuating means can be inserted in the receptacle such that either the first or the second actuating contour faces toward the connection. The association of the actuating contours with the end faces in this design additionally has manufacturing advantages.

For the purpose of supplying the medium to the tool interface, it has furthermore proven beneficial when at least one discharge opening is formed in the outer wall of the actuating means, which discharge opening is connected to a longitudinal passage formed in the actuating means. Consequently, the medium can enter the longitudinal passage from the outlet of the container for media and be discharged from the at least one discharge opening. In an especially preferred embodiment, the actuating means has a circular cross-section. In this case, it has proven successful when the at least one discharge opening is formed as a radial discharge opening. Provision is in particular also made within the scope of the invention that the longitudinal passage is continuously connected to the first and/or second actuating contour.

In this context, it has also proven to be especially beneficial when the longitudinal passage is designed as a longitudinal hole having an internal thread, into which a limiter can be screwed. The limiter can be screwed different distances into the longitudinal hole in this design, by which means it is possible, depending on the actuating contour used, to prevent a discharge of the medium from the end of the longitudinal passage facing the coupling section and at the same time to ensure the discharge of the medium from the discharge opening.

In order to be able to supply the medium to the tool interface in a targeted way, it has also proven especially successful when at least one media passage is formed in the wall of the coupling element. Within the scope of the invention, the media passage in this case can either be formed through a generative manufacturing process of the coupling element or through a conventional manufacturing process, in particular through drilled holes. It has also proven successful in this context when the media passage includes an annular recess in the inner circumference of the seat. In an especially preferred embodiment, a check valve is arranged in the media passage, as a result of which the medium is only discharged when the actuating means is in the dispensing position.

It has also proven to be especially beneficial within the scope of the invention when the actuating means includes at least one tappet section and a collar. The actuating contour, in particular, can be formed on the end face of the at least one tappet section in this case, and a guidance of the actuating means within the coupling element is ensured by the collar. It has also proven advantageous in this context when the collar is sealed with respect to the wall of the seat by a sealing means. This achieves in a simple way the result that the medium does not reach the tool interface in an uncontrolled manner, but only through the media passages intended for this purpose that are made in the wall of the coupling element. It has additionally proven to be beneficial when the seat has a shoulder delimiting the axial movement of the actuating mean in the direction of the coupling section, which shoulder preferably interacts with the collar of the actuating means.

It has also proven to be especially beneficial when the angle between the coupling section and the connection is between 0° and 90°. In the case of an angle of 0°, the coupling section can advantageously be arranged in a line with the connection, whereas in the case of an angle of 90°, which can be beneficial especially when space is tight, the coupling section and the connection are arranged perpendicular to one another.

Furthermore, it has proven advantageous when the coupling section is selected from a group that includes hollow taper shanks, polygonal shank tapers, TS tapers, steep tapers, and toolholders with cylindrical shank. In this way, simple, standardized coupling sections are provided that are received in the corresponding tool interfaces and can be secured there by the clamping device.

In a preferred embodiment, moreover, a return spring arranged between the coupling element and the actuating means is provided, through which spring a restoring force acting in the direction of the closed position is exerted on the actuating means. As a result, the actuating means is pushed into the closed position, thus reducing the risk of an unintentional release of the lubricant.

Provision is also made within the scope of the invention that the actuating means is designed as a piston having a first piston surface that can be acted upon in a first pressure chamber by a medium delivered from the spindle side in order to move the actuating means from the closed position to the dispensing position. Alternatively or in addition, provision is also made, furthermore, that an axial projection that serves as a piston with a second piston surface and is axially movable in a second pressure chamber by a medium delivered from the spindle side is associated with the actuating means. The projection in this case can be accommodated, in particular, in a passage formed in the pressure piece of the clamping device in which the second pressure chamber is formed. As a result, a movement of the actuating means from the closed position to the dispensing position can be achieved even without actuation, or at least without a repeated actuation, of the clamping device.

The object relating to the machine tool attachment is attained according to the invention by a machine tool attachment for delivering a medium to a part of a machine tool, having a coupling element according to one of claims 1 to 12 and a container for media that has an outlet and is attached to the connection of the coupling element, and also having an actuating means that is movable between a dispensing position, in which the medium is discharged from the container for media, and a closed position, in which a discharge of the medium is prevented.

As a result, a machine tool attachment is provided with which a medium—for example a lubricant—can be delivered automatically to a part of a machine tool. In particular, the machine tool attachment can also be held in a tool tray of a machine tool and be automatically changed by means of a tool changer. Due to the actuating means, it is ensured in a simple way in this design that the discharge of the medium from the container for media can be controlled by the position of the actuating means. In the dispensing position, the actuating means acts on the outlet of the container for media such that the medium is discharged therefrom. In the closed position of the actuating means, in contrast, the discharge of the medium is prevented. Provision is also explicitly made within the scope of the invention, however, that the actuating means is not associated with the coupling member, but rather with the container for media itself. This is advantageous when the medium is intended to be delivered to the workholding device, for example. In this case, the actuating means can be arranged on the side of the container for media facing away from the coupling member, and in particular can also be formed integrally with the outlet or as part of the outlet.

It has also proven to be beneficial, furthermore, when the container for media can be detachably attached to the connection. This ensures in a simple way that the container for media can be replaced when the container for media is empty or when the fill level falls below a specified value.

It has also proven especially advantageous, furthermore, when a dosing unit is provided for limiting the quantity of medium discharged. It is ensured by this means that the quantity of medium discharged is always constant, which has a beneficial effect on reproducibility of the lubrication result.

Moreover, it has also proven successful when a protective cover enclosing the container for media is provided that is attachable to the coupling element. By means of the protective cover, a guidance and centering of the container for media can also be achieved, in particular, in addition to mechanical protection for the container for media. The protective cover in this design can, in particular, be screwed tightly to the coupling element, or be otherwise detachably attached. In addition, the protective cover can itself be part of the container for media.

In addition, manageability of the machine tool attachment according to the invention is further improved by the means that the container for media is designed as a spray can whose valve forms the outlet. In this regard, all types of spray can may be used with the machine tool attachment according to the invention, wherein it has proven successful when the medium is conducted out of the container for media in a known manner by a propellant and/or by a mechanical device. In the dispensing position, the actuating means acts on the valve and opens it so that the medium can be discharged from the valve.

The area of application for the machine tool attachment can also be expanded by the means that a secondary outlet is associated with the container for media on the end face opposite the outlet, or that a secondary container is provided whose outlet is arranged on the end face of the secondary container pointing away from the coupling element. In this way, the option is provided of using the machine tool attachment according to the invention to deliver a medium not only to the tool interface of the machine tool but also to a workholding device that is located opposite the tool interface in the machine tool and that holds the workpiece to be machined. Consequently, the machine tool attachment that is held, and preferably secured, in the tool interface must merely be moved toward the workholding device in order to deliver the medium to the workholding device. If contact then occurs between the secondary outlet of the container for media or the outlet of the secondary container and the workholding device, the medium is automatically delivered to the workholding device. In this design, a secondary actuating means, in particular, has proven successful that acts on the secondary outlet or on the outlet of the secondary container in such a manner that, by means of its axial movement, medium is discharged from the container for media or the secondary container and can be conducted to the workholding device. Alternatively, the container for media can also be attached to the connection of the coupling element such that its outlet points away from the coupling element.

It has also proven to be especially beneficial when the medium is selected from a group that includes lubricants, air, and liquid or gaseous fluids. Especially when the medium is a lubricant, the utility of the machine tool attachment is increased.

The object relating to the machine tool is attained according to the invention by a machine tool having a machine tool attachment according to one of claims 13 to 19 that can be held in a tool interface.

The object relating to the method is attained according to the invention by a method for delivering a medium to a part of a machine tool, wherein the method includes the steps:

inserting a machine tool attachment according to one of claims 13 to 19 into a tool interface of the machine tool, moving the actuating means out of the closed position into the dispensing position, dispensing the medium from the container for media, and delivering the medium to the part of the machine tool, moving the actuating means out of the dispensing position into the closed position, and ending the dispensing and delivery of the medium, and taking the machine tool attachment out of the tool interface.

In this way, a method is provided that makes an automatic delivery of a medium to a part of a machine tool possible in a simple way. Provision is in particular also made within the scope of the invention in this regard that the machine tool attachment is placed in a tool tray of the machine tool before and after the delivery of the medium. Consequently, the delivery of the medium can take place fully automatically, without any need for the machine tool attachment to be inserted manually. When delivery of the medium is required, the machining tool located in the tool interface is placed in the tool tray and the machine tool attachment according to the invention is taken out of the tool tray and inserted into the tool interface. After delivery of the medium, the machine tool attachment is then taken out of the tool interface again and placed in the tool tray. Following this, the next machining tool can be inserted into the tool interface.

Lubrication can then be carried out especially simply when the transfer of the actuating means of the coupling element between the closed position and the dispensing position is carried out by a part of the machine tool. Provision is made here, in particular, that the delivery takes place as soon as the coupling section is inserted into the tool interface or not until the coupling element is clamped in the clamping device. If the release of the medium takes place as soon as the machine tool attachment is inserted into the tool interface—for example by means of the contact occurring between a pressure piece of a clamping device and the actuating means—then the release is advantageously interrupted by the process of clamping the machine tool attachment in the tool interface, and a second release occurs during ejection of the machine tool attachment from the tool interface. In particular, the medium is distributed in the tool interface and, in particular, in the mechanism of the clamping device, by the clamping process that follows the first release. Provision is also made in this regard that the release of the medium is accomplished by the contact occurring between the actuating means and a workholding device that is located opposite the tool interface.

Alternatively or in addition, however, provision is also made within the scope of the invention that the actuating means is moved from the closed position into the dispensing position by a spindle-side supply of medium into a first pressure chamber and/or into a second pressure chamber. In normal operation, the media provided for the movement, as for example cooling lubricants or compressed air, come from the spindle side and are delivered through a passage in the pressure piece to a tool held in the tool interface, for example in order to lubricate the tool. The first pressure chamber can be in the space formed in the coupling element between the coupling section and the actuating means. Depending on the design, an additional seal between the coupling section and the tool holder of the spindle can be dispensed with here. The medium coming from the spindle and flowing into the first pressure chamber then moves the actuating means from the closed position into the dispensing position, causing the medium to flow out of the container for media. The second pressure chamber can be formed in the pressure piece itself, for example, in the passage of which a projection that extends the actuating means axially is introduced when the coupling element is inserted into the tool holder. The projection is advantageously sealed in the passage by a seal. By means of the medium delivered on the spindle side, the projection acting as a piston is now moved axially, and thus the actuating means is also moved from the closed position into the dispensing position. The movement of the actuating means from the closed position into the dispensing position that is independent of the actuation of the clamping device is associated here with the advantage that the delivery of the lubricant to the clamping device can even occur without the position of the clamping device having to be changed.

It has also proven to be advantageous when the dispensing of the medium is repeated after a specifiable number of tool changes or after a specifiable time interval. It is ensured by this means that the medium is repeatedly dispensed at regular intervals. Provision is also made within the scope of the invention, however, that the clamping force of the tool interface is monitored and the release of the medium to the tool interface is carried out no later than when the clamping force falls below a specifiable value.

It has also proven to be especially advantageous, moreover, when a change of the container for media is performed after a specifiable number of releases. This achieves the result that the fill level of the container for media is always sufficiently high to ensure a release of the medium. Since the quantity of medium dispensed per release is known, it is possible to omit fill level monitoring and to replace the container for media early enough before it is completely emptied.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
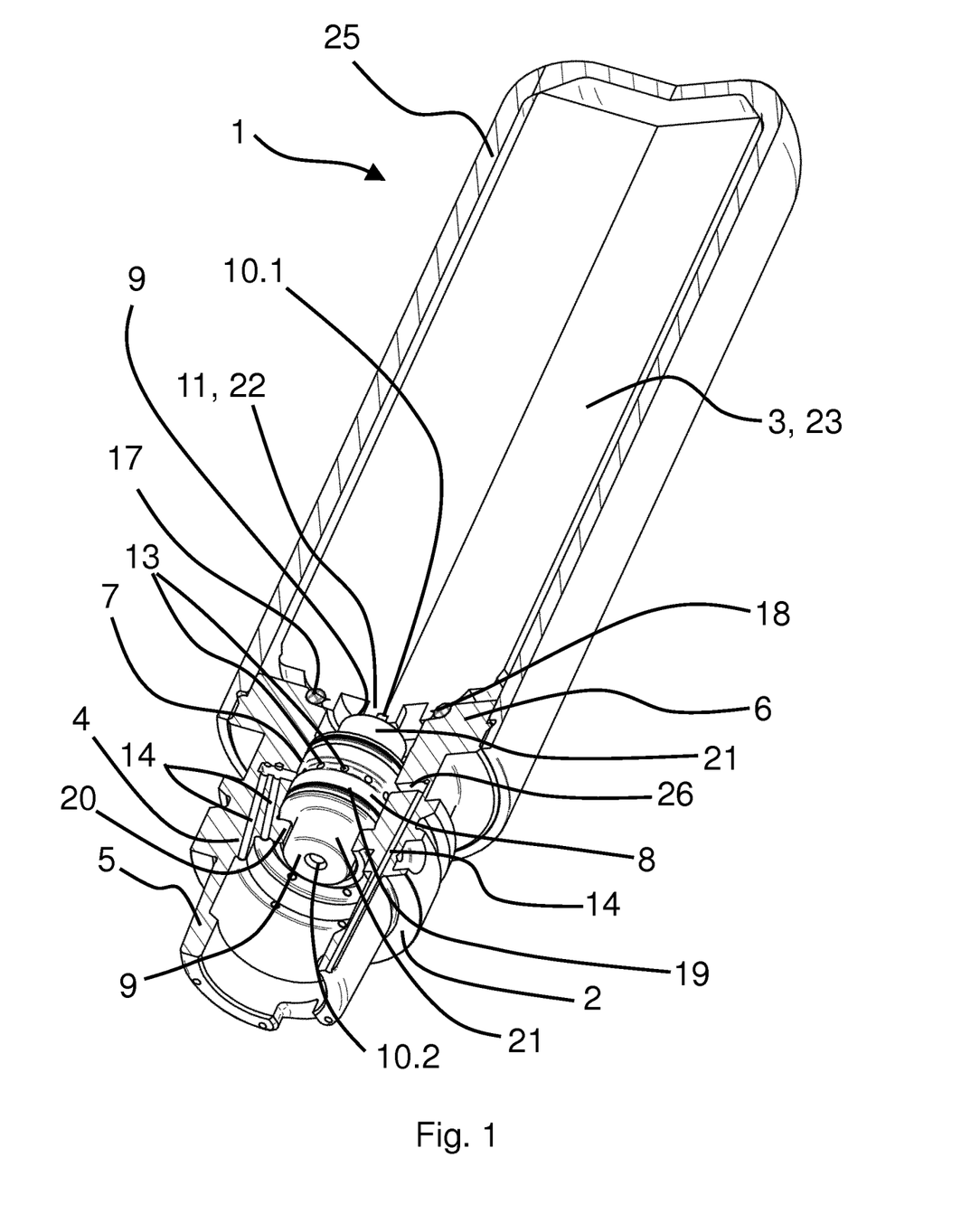
FIG. 1 a partially cross-sectional view of a first embodiment of a machine tool attachment, FIG. 2 a cross-sectional view of a coupling element in the closed position, FIG. 3 a cross-sectional view through the machine tool attachment in the closed position, FIG. 4 the cross-sectional view from FIG. 3 in the dispensing position, FIG. 5 a cross-sectional view through a machine tool attachment inserted in a tool interface in the dispensing position, FIG. 6 the cross-sectional view from FIG. 5 in the closed position, FIG. 7 a cross-sectional view through a second embodiment of a machine tool attachment inserted in a tool interface, FIG. 8 a partially cross-sectional view through a third embodiment of the machine tool attachment with a secondary container, and FIG. 9 a fourth embodiment of the machine tool attachment according to the invention.

FIG. 1 shows, in a partially cross-sectional view, a first embodiment of a machine tool attachment 1 for delivering a medium composed of a lubricant to a tool interface 60 of a machine tool that is composed of a coupling element 2 and a container for media 3. At one end, the coupling element 2 includes a coupling section 5 corresponding to the tool interface 60, and at the other end includes a connection 6, to which the container for media 3 is attached. Formed in the coupling element 2 is a seat 7 in which an actuating means 8 is mounted so as to be movable axially between a dispensing position, in which the lubricant is discharged from the container for media 3, and a closed position, in which a lubrication of the tool interface 60 is prevented. The actuating means 8 in this design has, on the end faces 9, a male actuating contour 10.1 and a female actuating contour 10.2, of which the male actuating contour 10.1, in the dispensing position, acts on an outlet 11 formed on the container for media 3. As a result, the medium implemented as lubricant is discharged from the container for media 3, and is fed into a longitudinal passage 12 formed in the actuating means 8, and carried to radial discharge openings 13. From there it is conducted through media passages 14, which are formed in the one wall 4 of the coupling element 2, to the tool interface 60. The media passages 14 in this design open into the coupling element 2 in an axially staggered and radially arranged fashion.

Figure 2:
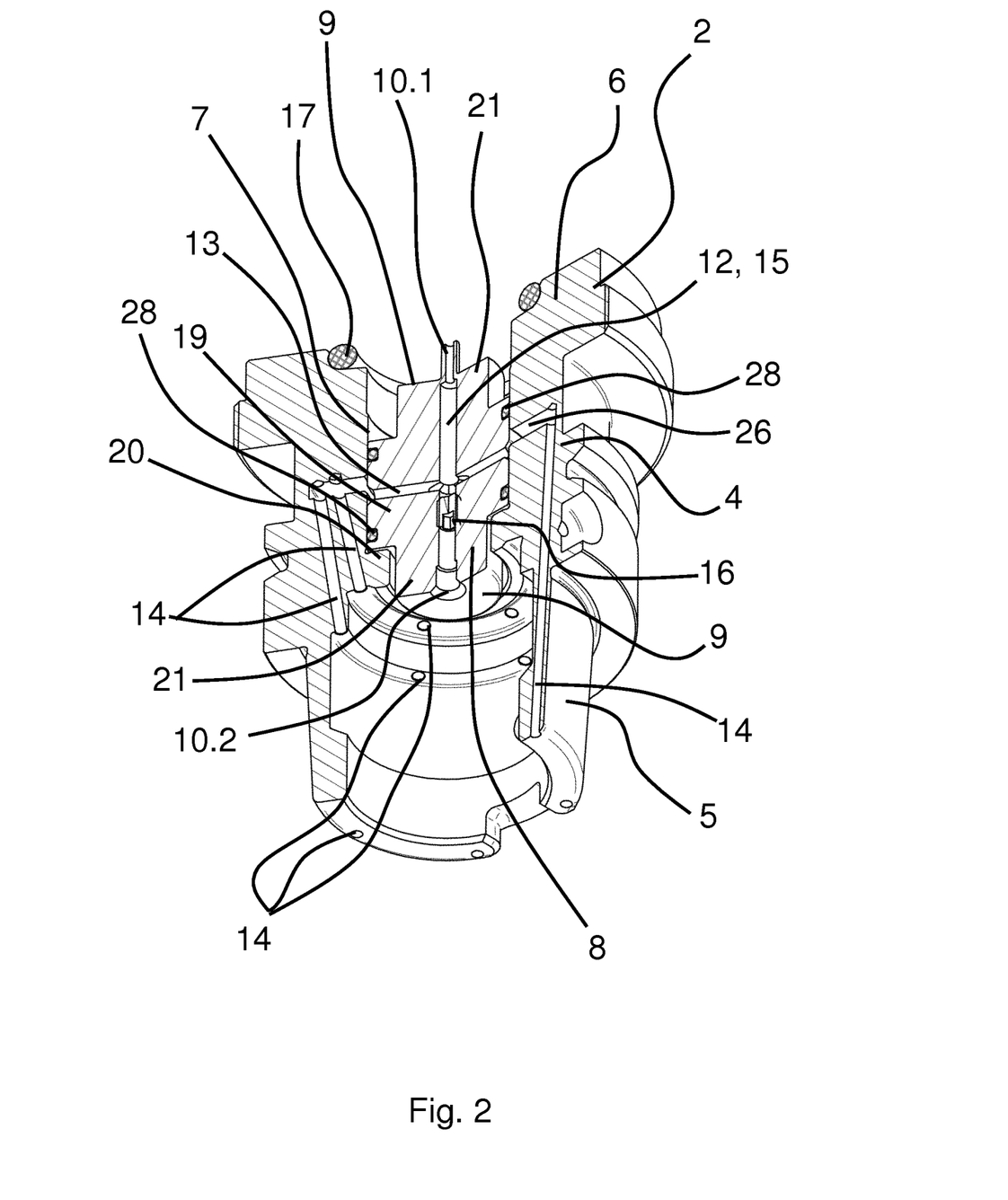

FIG. 2 shows the coupling element 2 according to the invention in a cross-sectional view. It can be seen from this, in particular, that the actuating means 8 has the longitudinal passage 12, which in the exemplary embodiment shown has an internal thread 15 into which a limiter 16 is screwed. The actuating means 8 has two differently shaped actuating contours 10.1 and 10.2, which are formed on opposite end faces 9 and by means of which different containers for media 3 can be used. For this purpose, the actuating means 8 can be taken out of the seat 7 formed in the coupling element 2 and turned around when a female actuating contour 10.2 should be used instead of the male actuating contour 10.1, which is provided in the exemplary embodiment shown for acting on the container for media 3 that is not shown in the drawing. In this case, the limiter 16 must be screwed further into the longitudinal passage 12 that has the internal thread 15, past the mouth of the radial discharge openings 13.

Figure 3:
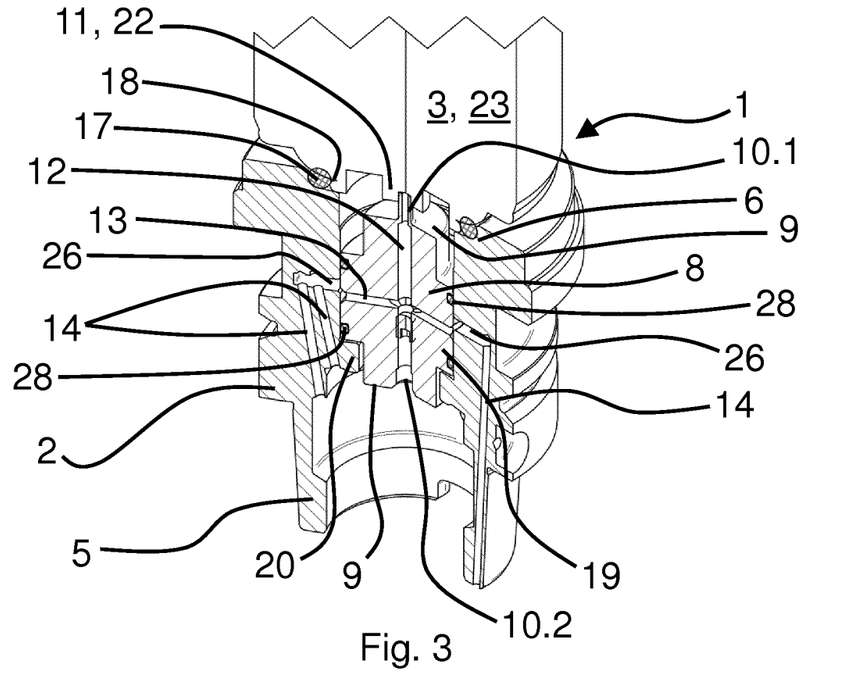
Figure 4:
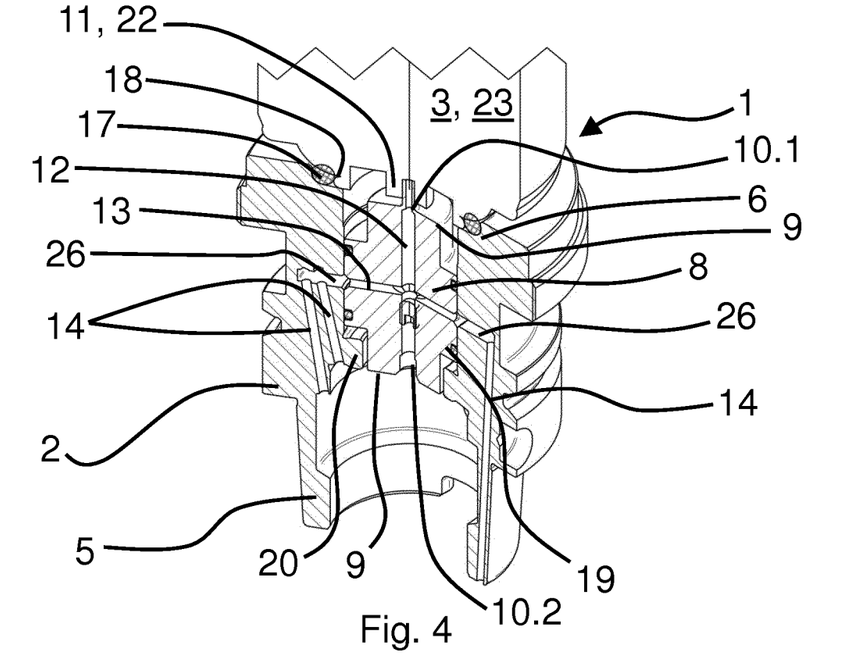

In the cross-sectional view shown in FIG. 3, the container for media 3 is attached to the connection 6 of the coupling element 2. For this purpose, a retaining ring 17 is provided that engages a corresponding groove 18 that is formed on the outlet 11 of the container for media 3. In FIG. 3, the actuating means 8 is in the closed position, in which a discharge of the medium implemented as lubricant from the container for media 3 is prevented. In this position, the outlet 11 of the container for media 3 is not acted upon by the actuating means 8. Moreover, the radial discharge openings 13 that are formed in a collar 19 of the actuating means 8 are not aligned with the media passages 14 that are formed in the wall 4 of the coupling element 2. As is shown by a comparison with the dispensing position of the actuating means 8 shown in FIG. 4, the actuating means 8 is movable within limits inside the seat 7. This movement is limited in the direction of the coupling section 5 by a shoulder 20 formed on the seat 7, against which the actuating means 8 rests when in the closed position. Adjoining the collar 19 in each case is a tappet section 21, on the end faces 9 of which are formed the actuating contours 10.1 and 10.2. The collar 19 is sealed in the seat 7 by sealing means 28 so that the lubricant cannot enter the seat 7 from the radial discharge openings 13 in an uncontrolled manner, but rather is conducted in a targeted manner to the tool interface 60 through the media passages 14 only in the dispensing position shown in FIG. 4. In the dispensing position, the actuating means 8 is moved axially toward the outlet 11 of the container for media 3, and in the process actuates a valve 22 constituting the outlet of a spray can 23 that constitutes the container for media 3. The movement of the actuating means 8 from the closed position into the dispensing position can be accomplished here by the action of a pressure piece 65 of a clamping device 63 of the tool interface 60 on the actuating means 8. Upon insertion of the machine tool attachment 1 in the tool interface 60, contact occurs between the pressure piece 65 of the clamping device 63, which is axially movable, and the end face 9 of the actuating means 8. As a result, the actuating means 8 is moved axially toward the connection 6, by which means the male actuating contour 10.1 engages the outlet 11, implemented as a female valve 22, of the spray can 23 and moves the valve 22, by which means the lubricant in the spray can 23 flows out of the spray can 23 and is delivered to the tool interface 60.

Figure 5:
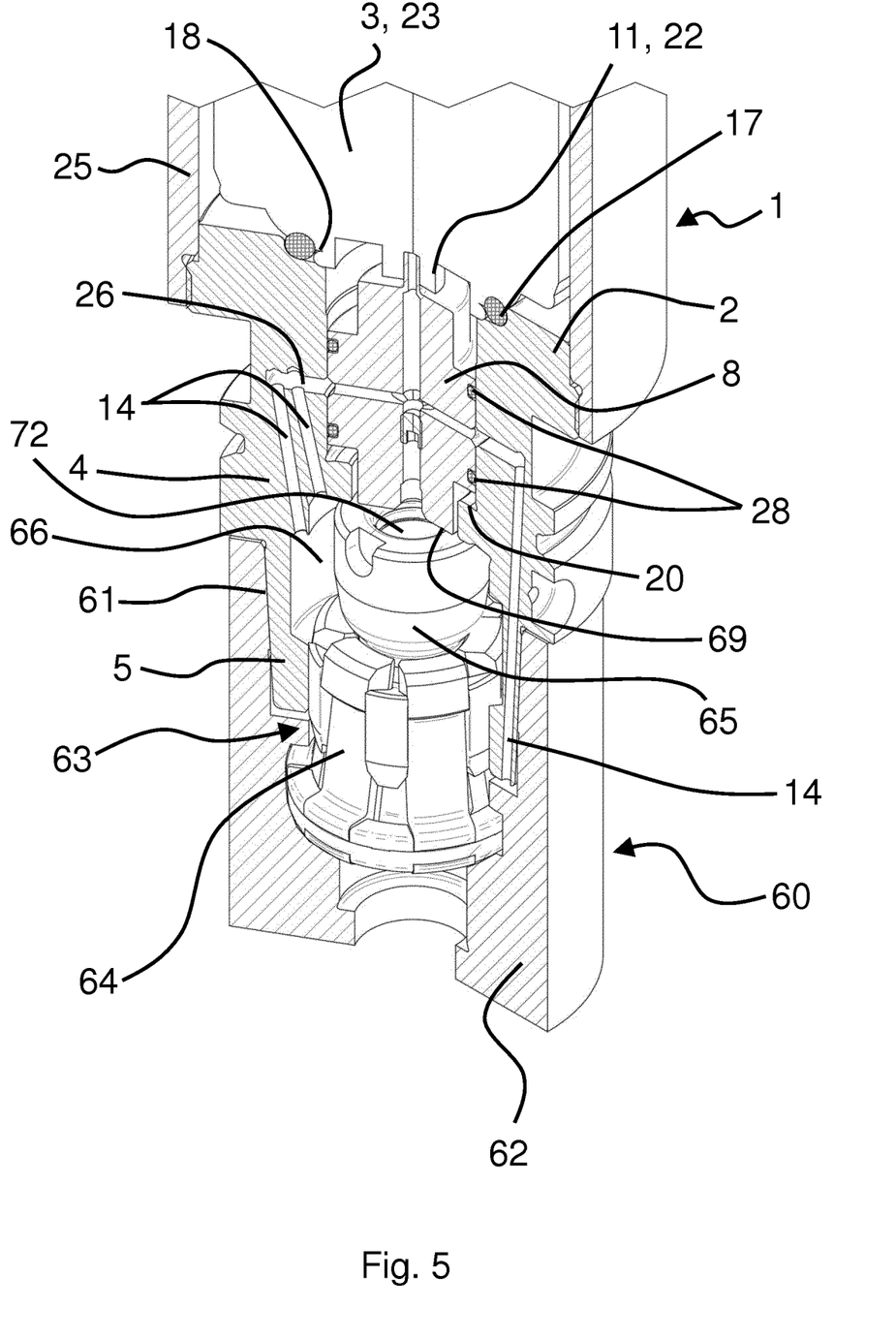

FIG. 5 shows a cross-sectional view through the machine tool attachment 1 according to the invention, which is inserted in a tool interface 60 of a machine tool. The tool interface 60 here includes a tool holder 61, which corresponds to the coupling section 5 and is formed in an end face of a spindle body 62. Arranged in the interior of the spindle body 62 is a clamping device 63 with a segment collet 64, which can be moved in a known manner between a clamping position and a release position by means of the axial movement of a pressure piece 65. In the cross-sectional view shown in FIG. 5, the clamping device 63 is in the release position, in which the pressure piece 65 is moved axially in the direction of the machine tool attachment 1. As a result, when the machine tool attachment 1 is inserted into the tool holder 61, contact occurs between the actuating means 8 and the pressure piece 65, by which means the actuating means 8 is lifted by the shoulder 20 in the direction of the connection 6 that is formed in the coupling member 2. In the process, the actuating means 8 is moved axially from the closed position into the dispensing position, which is shown in FIG. 5, and acts on the outlet 11 of the container for media 3 in such a manner that the lubricant is discharged therefrom and is conducted through the media passages 14 to the clamping device 63.

Figure 6:
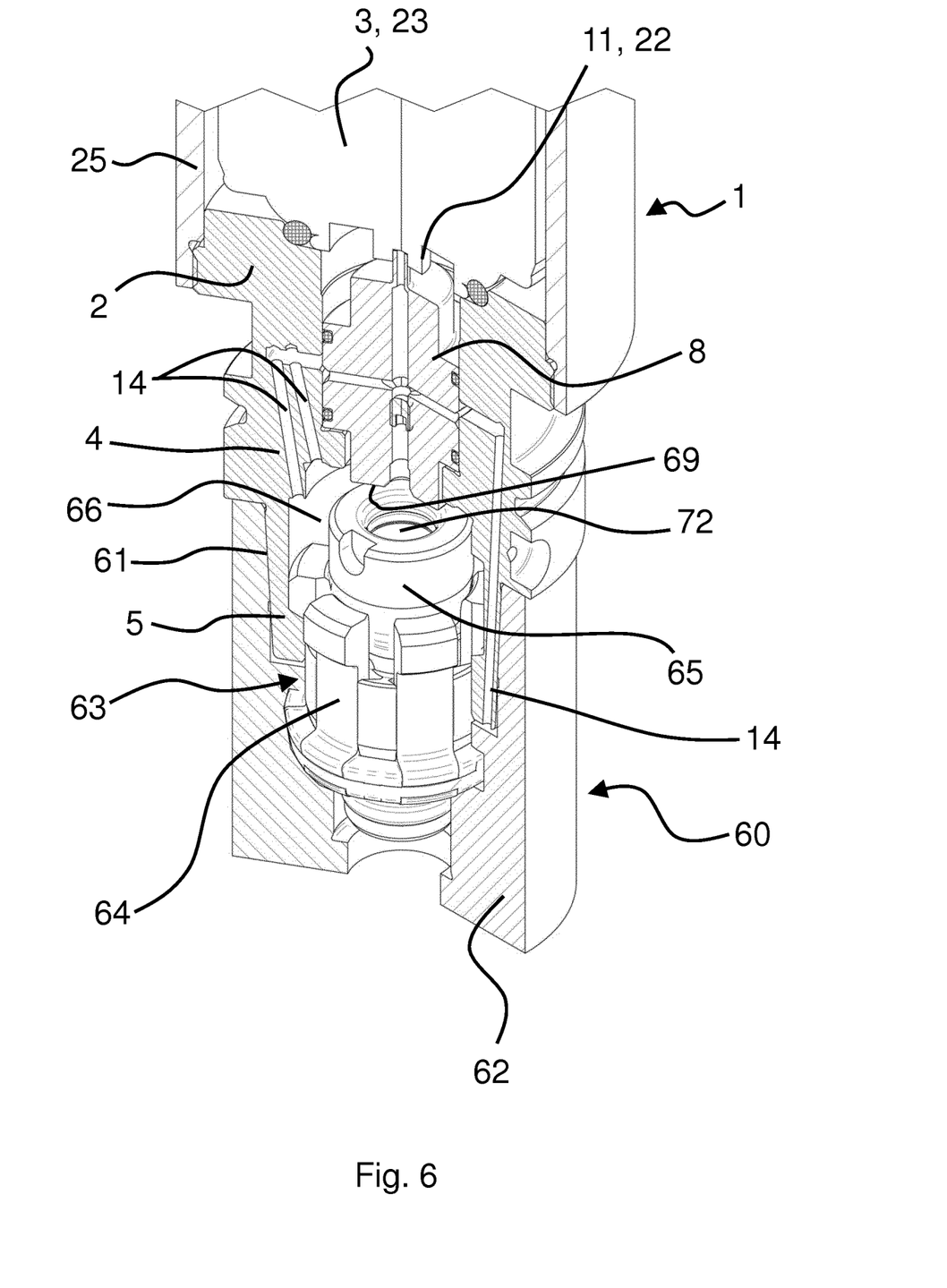

In order to better distribute the lubricant in the tool interface 60, and in particular in the clamping device 63 thereof, the clamping device 63 is now transferred from the release position shown in FIG. 5 into the clamping position that is shown in FIG. 6. For this purpose, the pressure piece 65 is moved axially, namely away from the machine tool attachment 1. As a result, the clamping surfaces of the segment collet 64 are moved radially outward and engage the coupling section 5 of the coupling element 2 and secure the same in the tool holder. In the clamping position, the pressure piece 65 now no longer acts on the actuating means 8, which is now in the closed position again, so no lubricant is discharged from the container for media 3 implemented as spray can 23. If the clamping device 63 is released again, starting from the clamping position shown in FIG. 6, which is to say if the pressure piece 65 is again moved axially in the direction of the coupling element 2, then the actuating means 8 is moved axially from the closed position into the dispensing position here, too, and thus the tool interface 60 is lubricated again. It is also evident from FIGS. 5 and 6 that the protective cover 25 is secured on the coupling element 2 by a threaded connection.

At the same time, however, in the embodiment shown in FIGS. 5 and 6, a seal with respect to the tool holder 61 is achieved in the region of the coupling section 5 as a function of the design, so that a first pressure chamber 66 is formed in the coupling element 2 as a result. The actuating means 8 projects into this first pressure chamber 66 in this design and forms a piston with a first piston surface 69 so that it is possible to move it from the closed position into the dispensing position by subjecting it to a pressure medium fed into the first pressure chamber 66 in order to deliver the lubricant located in the container for media 3 to the clamping device 63 through the media passages 14. The delivery of the pressure medium into the first pressure chamber 66 in order to act on the actuating means 8 is accomplished in this case on the spindle side through a passage 72 formed in the pressure piece 65. Possibilities for the pressure medium here include, in particular, compressed air, high-pressure blast air, and sealing air.

Figure 7:
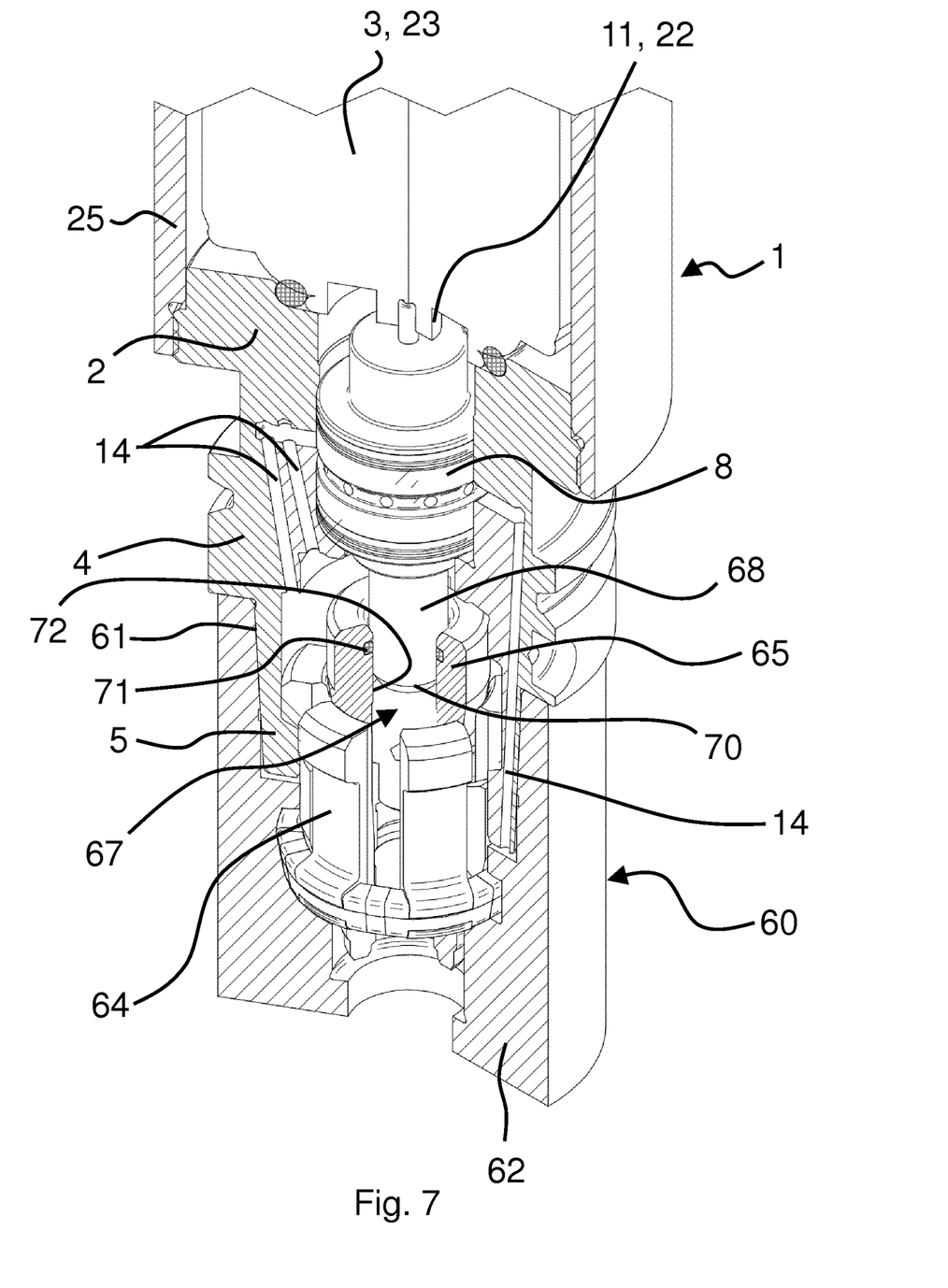

In FIG. 7, a second embodiment of a machine tool attachment 1 according to the invention is shown, in which a projection 68 is associated with the actuating means 8; when the machine tool attachment 1 is inserted into the tool holder 61, said projection is introduced into a passage 72 which opens into the end face of the pressure piece 65 and through which cooling lubricant coming from the spindle is conducted to the machining tool during normal operation of the chuck. In this design, the projection 68 in the passage 72 is sealed by a seal 71 that is arranged in the interior of the passage 72, by which means a second pressure chamber 67 is ultimately formed in the passage 72, and the projection 68 serves as a piston with a second piston surface 70. If the cooling lubricant is now conducted from the spindle side into the second pressure chamber 67 when the actuating means 8 is inserted, then the projection 68 is moved axially in the direction of the valve 22 as a result of the cooling lubricant acting upon it, by which means the actuating means 8 ultimately is moved from the closed position into the dispensing position, and the lubricant is thus discharged from the container for media 3 and conducted to the clamping device 63 through the media passages 14.

Figure 8:
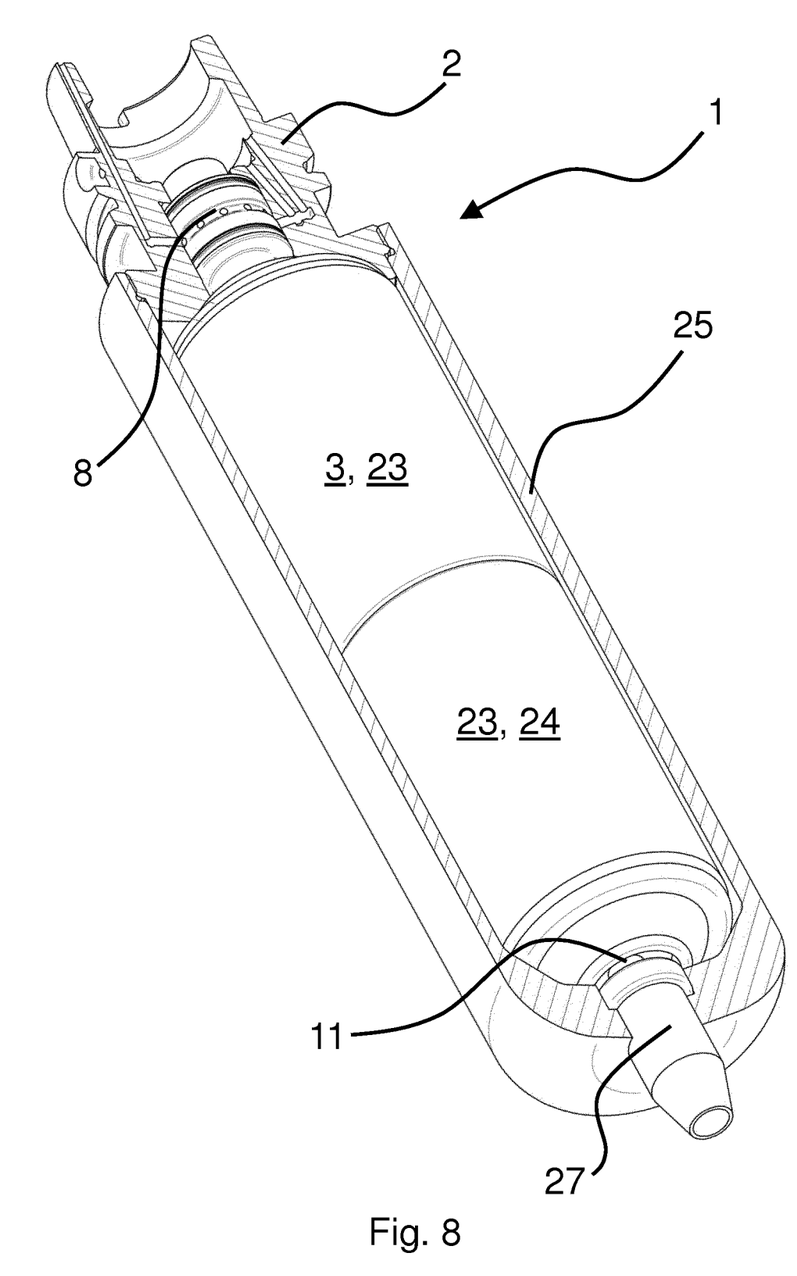

FIG. 8 shows another embodiment of the machine tool attachment 1 according to the invention, in which a secondary container 24 is provided that is arranged to be axially staggered with respect to the lubricant container 3, wherein the outlet 11 of the secondary container 24 is arranged opposite the outlet 11 of the lubricant container 3. As a result, it is possible to move the machine tool attachment 1 held in the tool interface 60 toward a workholding device, and to carry out lubrication there. For this purpose, a secondary actuating means 27 is provided that can be moved toward the outlet 11 of the secondary container 24 so that lubricant located therein can be discharged.

Figure 9:
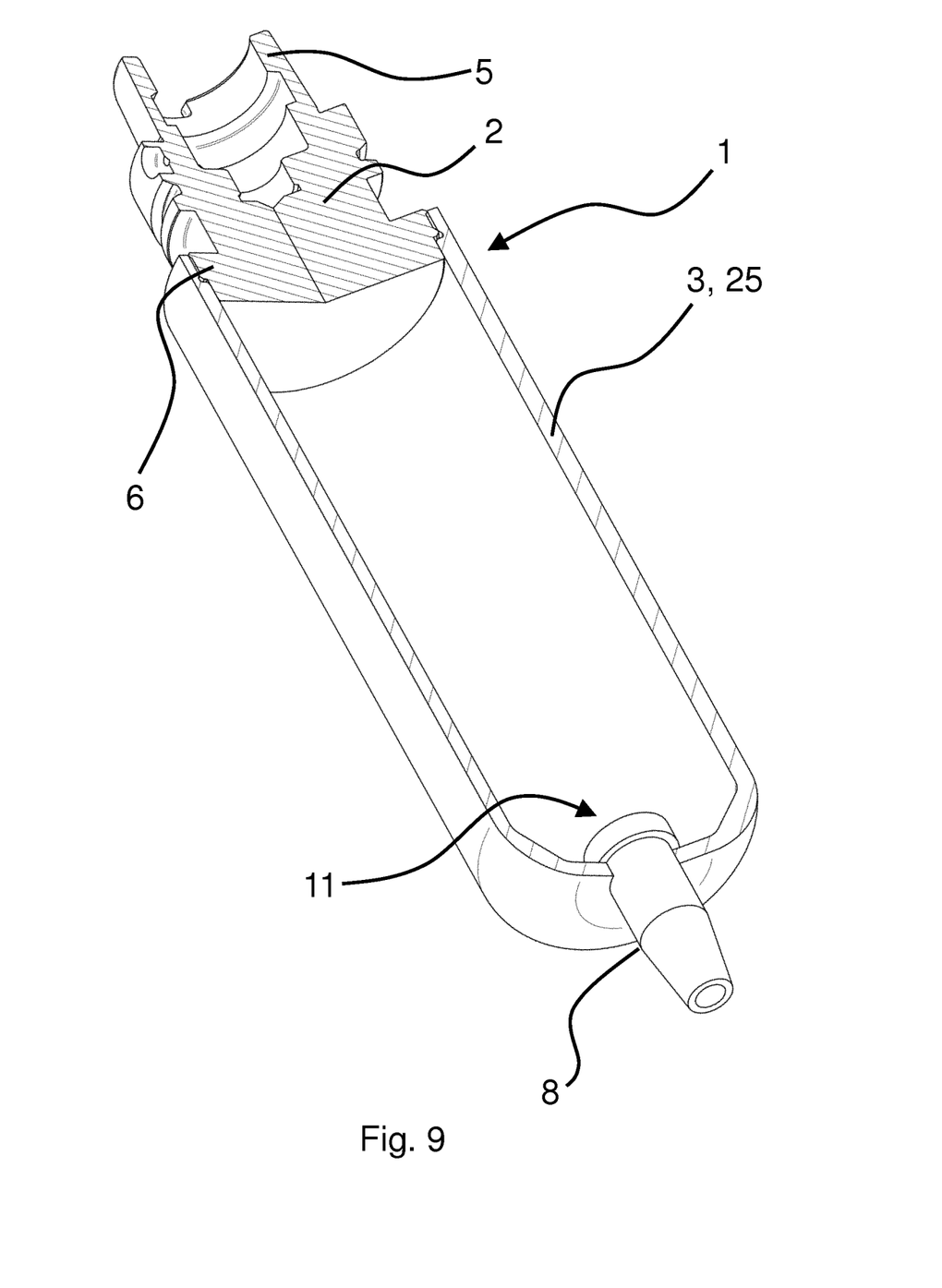

FIG. 9 shows a fourth embodiment of the machine tool attachment 1 according to the invention that is composed of the coupling element 2 and a container for media 3 attached to the connection 6. The machine tool attachment 1 in this design can be held in a tool interface 60, and secured there, by the coupling section 5 formed on the coupling element 2. In the exemplary embodiment shown, the container for media 3 is composed of the protective cover 25 itself, which is secured to the connection 6 of the coupling element by a threaded connection. On the end face pointing away from the connection 6, an actuating means 8 that is movable between a closed position and a dispensing position is associated with the container for media 3; in the dispensing position it acts on the outlet 11 of the container for media 3, which is not shown in detail in the drawing, by which means the medium in the container for media 3, which is implemented as lubricant or as liquid or gaseous fluid, is discharged from the container for media 3. For this purpose, the actuating means 8 need only be moved toward the object that the medium should be delivered to. As a result, a movement of the actuating means 8 then occurs from the closed position into the dispensing position, and the medium in the container for media 3 is thus delivered to the object—for example a workholding device.

In the following, the method according to the invention is described once more. When a supply of medium to a part of the machine tool becomes necessary after a specified number of tool changes or a specified period—for example to lubricate the tool interface 60 or a workholding device—then the machine tool attachment 1, which is stored in a tool tray of the machine tool for this purpose, is inserted into the tool interface 60 in place of a machining tool. This is usually carried out fully automatically in this case by a tool changer. Upon insertion of the coupling section 5 into the tool interface 60, contact occurs between the actuating means 8 and a part of the tool interface 60, namely with the clamping device 63 of the tool interface 60 and here, in particular, with the pressure piece 65, which is supported so as to be axially movable for the purpose of moving the clamping device 63 between a release position and a clamping position. As a result, the actuating means 8 is moved axially toward the connection 6 and acts on the outlet 11 of the container for media 3, by which means the lubricant located therein is discharged from the container for media 3 and conducted through the longitudinal passage 12, which is formed in the actuating means 8, into the radial discharge openings 13 to the media passages 14, which are formed in the wall 4 of the coupling element 2. If the machine tool attachment 1 is then secured in the tool interface 60 in that the pressure piece 65 is moved axially away from the machine tool attachment 1 and, in the process, the clamping device is transferred from the release position into the clamping position, then the actuating means 8 is moved axially out of the dispensing position toward the shoulder 20 by a return mechanism—usually a spring—located in the outlet 11 of the container for media 3, with the result that the actuating means 8 is located in the closed position again. Now a release of the machine tool attachment 1 can take place in that the clamping device 63 is opened again. This is accompanied here by a repeated movement of the actuating means 8 from the closed position into the dispensing position so that a second lubrication takes place here.

Alternatively or in addition, however, the movement of the actuating means 8 can also be accomplished by the spindle-side delivery of a medium in that either compressed air, for example, is fed into the first pressure chamber 66 through the pressure piece 65, causing the actuating means 8 to be moved. Another possibility consists in forming a second pressure chamber 67 in the pressure piece 65 itself, into which chamber the actuating means 8, which has an axial projection 68 for this purpose that engages the passage 72, can be inserted. As a result of the action on the projection 68 of cooling lubricant, which is supplied on the spindle side of the second pressure chamber 67, the projection 68, ultimately functioning as a piston with a second piston surface 70, is moved axially, and thus the actuating means 8 is moved from the closed position into the dispensing position and, in doing so, actuates the valve 22 so that the lubricant in the container for media is delivered to the clamping device 63 through the discharge openings 14.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A coupling element for a machine tool attachment, having a coupling section for detachable mounting on a tool interface of a machine tool, and having a connection for attaching a container for media that has an outlet and holds a medium, wherein an actuating means is provided that is movable between a dispensing position, in which the medium is discharged from the container for media, and a closed position, in which a discharge of the medium from the container for media is prevented, and wherein at least one discharge opening is formed in an outer wall of the actuating means, the at least one discharge opening being connected to a longitudinal passage formed in the actuating means.

2. The coupling element according to claim 1, wherein the actuating means is movable between the closed position and the dispensing position by means of the coupling of the coupling section to the tool interface.

3. The coupling element according to claim 1, wherein the actuating means is supported in a seat formed in the coupling element so as to be axially movable between the closed position and the dispensing position.

4. The coupling element according to claim 3, wherein the actuating means includes at least one tappet section and a collar.

5. The coupling element according to claim 4, wherein the collar is sealed with respect to a wall of the seat.

6. The coupling element according to claim 1, wherein the actuating means has a first end face with a first actuating contour and a second end face with a second actuating contour.

7. The coupling element according to claim 1, wherein the longitudinal passage is designed as a longitudinal hole having an internal thread, wherein a limiter is screwed into the longitudinal hole.

8. The coupling element according to claim 1, wherein at least one media passage is formed in a wall of the coupling element.

9. The coupling element according to claim 1, wherein the angle between an axial extent of the coupling section and a radial extent of the connection is between 0° and 90°.

10. The coupling element according to claim 1, wherein the coupling section is selected from a group that includes hollow taper shanks, polygonal shank tapers, and steep tapers, as well as toolholders with a cylindrical shank.

11. A machine tool attachment for delivering a medium to a part of a machine tool, the machine tool attachment having:
   a coupling element that includes a coupling section for detachable mounting on a tool interface of the machine tool and a connection,
   a container for media that has an outlet and is attached to the connection of the coupling element, and
   an actuating means that is movable between a dispensing position, in which the medium is discharged from the container for media, and a closed position, in which a discharge of the medium is prevented,
   wherein at least one discharge opening is formed in an outer wall of the actuating means, the at least one discharge opening being connected to a longitudinal passage formed in the actuating means.

12. The machine tool attachment according to claim 11, wherein the container for media is detachably attached to the connection.

13. The machine tool attachment according to claim 11, wherein a protective cover enclosing the container for media is provided that is attachable to the coupling member.

14. The machine tool attachment according to claim 11, wherein the container for media is designed as a spray can whose valve forms the outlet.

15. The machine tool attachment according to claim 11, wherein a secondary outlet is associated with the container for media on an end face opposite the outlet, or in that a secondary container is provided whose outlet is arranged on an end face of the secondary container pointing away from the coupling element.

16. The machine tool attachment according to claim 11, wherein the medium is selected from a group that includes lubricants, air, and liquid or gaseous fluids.

17. A machine tool having a machine tool attachment according to claim 11 that can be held in the tool interface.

18. A method for delivering a medium to a part of a machine tool, including the steps:
   inserting a machine tool attachment according to claim 11 into the tool interface of the machine tool,
   moving the actuating means out of the closed position into the dispensing position, dispensing the medium from the container for media, and delivering the medium to the part of the machine tool,
   moving the actuating means out of the dispensing position into the closed position, and ending the dispensing and delivery of the medium, and
   taking the machine tool attachment out of the tool interface.

19. The method according to claim 18, wherein the movement of the actuating means between the closed position and the dispensing position is carried out by a part of the machine tool.

20. The method according to claim 18, wherein the actuating means is moved from the closed position into the dispensing position by a spindle-side supply of a medium into a first pressure chamber and/or into a second pressure chamber.

21. The method according to claim 18, wherein the dispensing of the medium is repeated after a specifiable number of tool changes or after a specifiable time interval.

22. The method according to claim 18, wherein a change of the container for media is performed after a specifiable number of releases of the medium.

* * * * *